March 14, 1950 S. S. BARKER 2,500,396
MACHINE FOR PROCESSING EGGS
Filed April 17, 1945 4 Sheets-Sheet 4

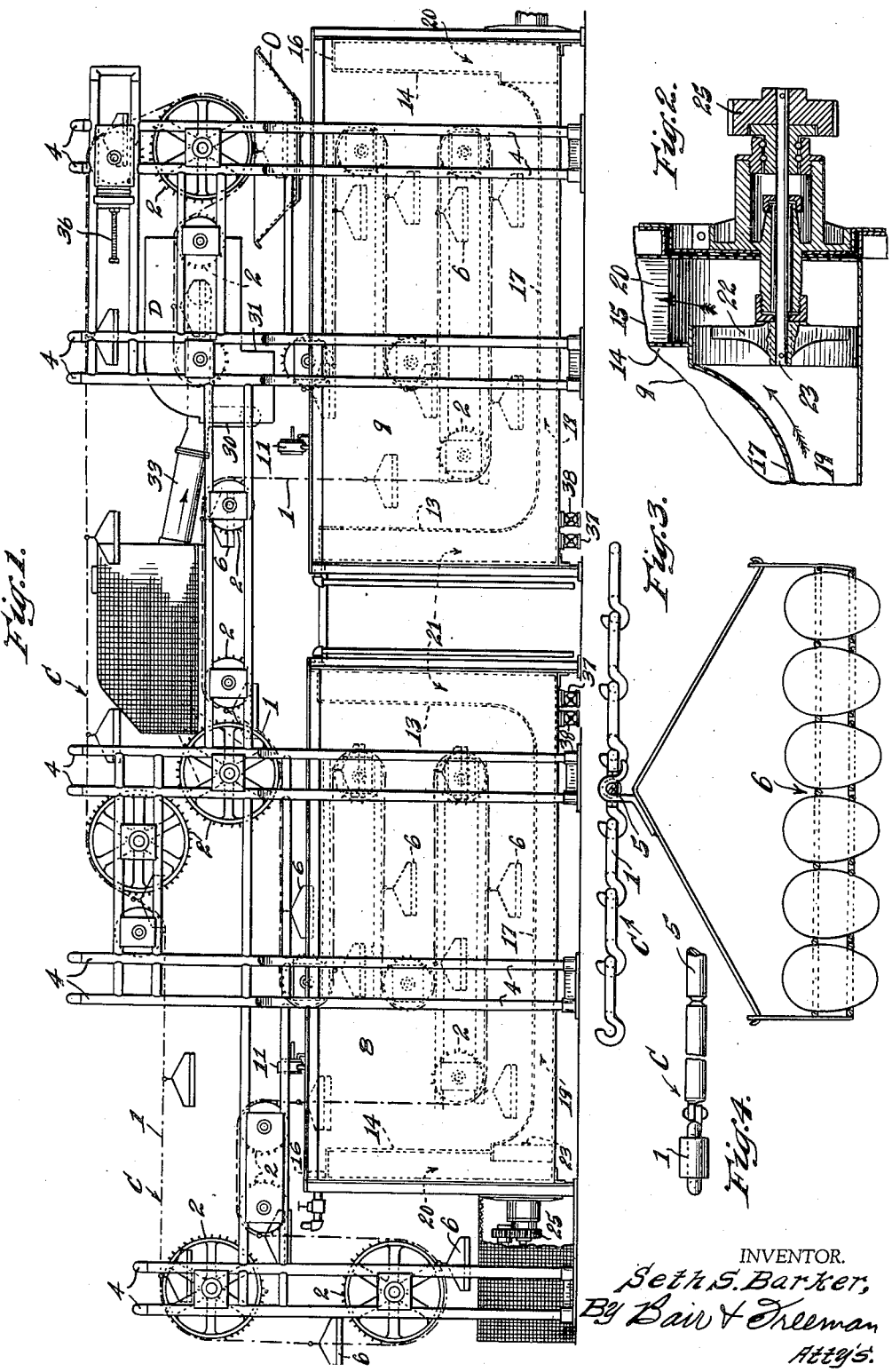

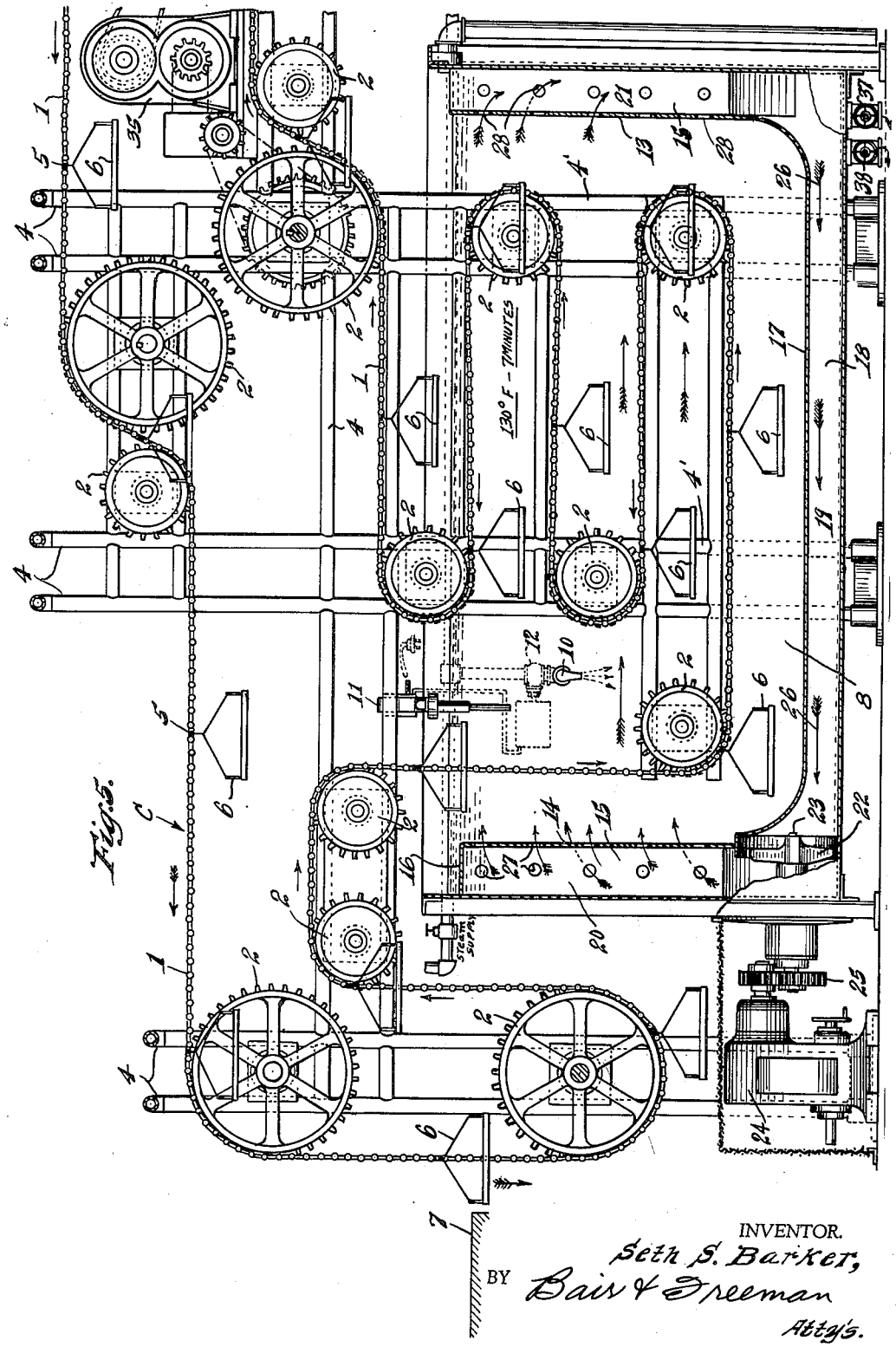

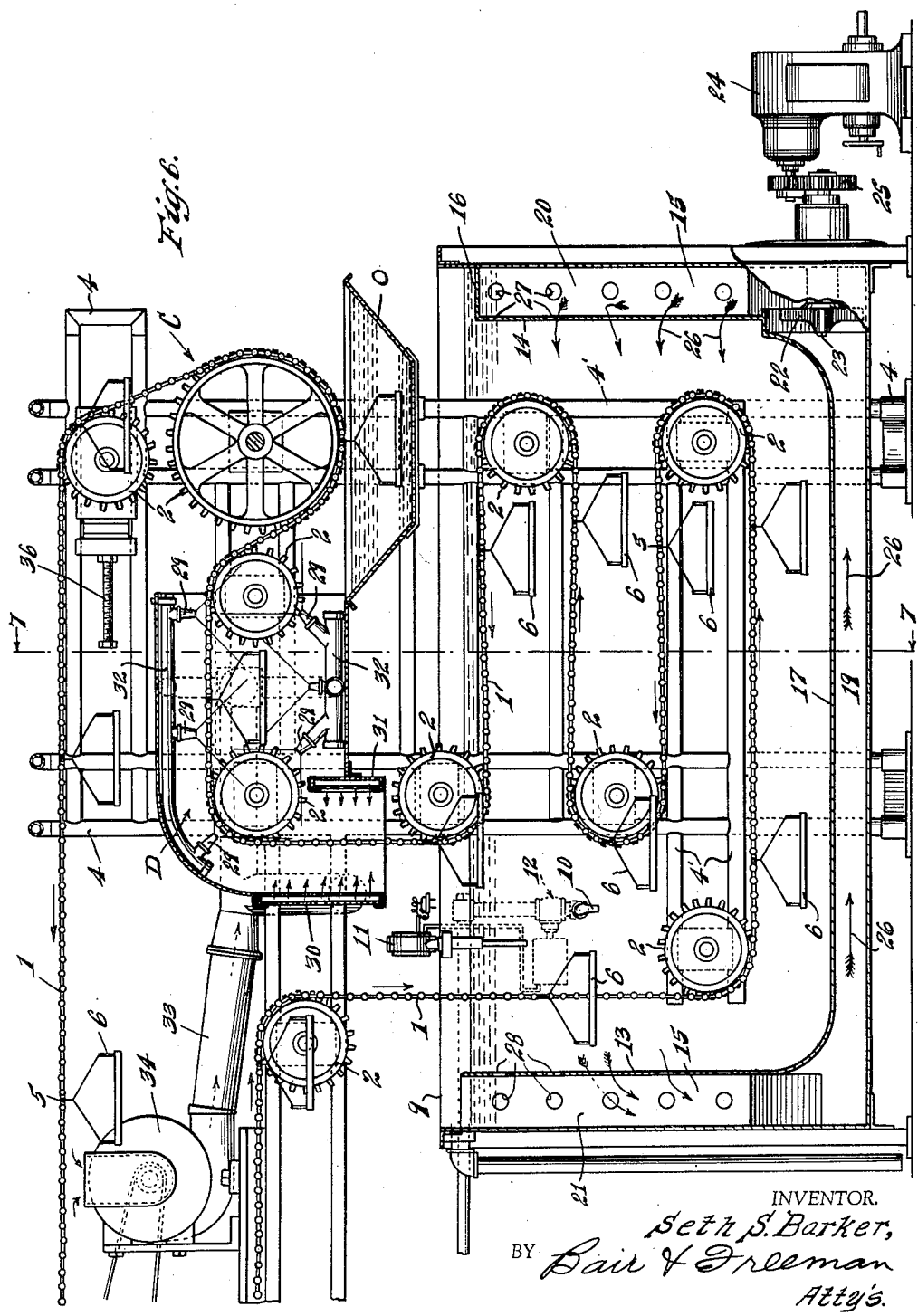

INVENTOR.
Seth S. Barker,
BY Bair & Freeman
Atty's.

Patented Mar. 14, 1950

2,500,396

UNITED STATES PATENT OFFICE 2,500,396

MACHINE FOR PROCESSING EGGS

Seth S. Barker, Ottumwa, Iowa

Application April 17, 1945, Serial No. 588,801

2 Claims. (Cl. 259—95)

The object of my present invention is to provide a machine for processing eggs.

It is the purpose of my invention to provide such a machine whereby eggs, regardless of their original temperature, may be heated, preferably in a water bath, to a uniform temperature for all the eggs of 130° F.

It is a further object to provide a machine that where, after the eggs are brought to uniform temperature, they may be subjected preferably in a second water bath, to a temperature of approximately 136° F. for approximately seven minutes.

In order to maintain the close temperature control required for the efficient operation of the machine to best accomplish the results desired, I prefer to provide means for agitating the water.

Another object is to provide means for maintaining the water or other heating liquid at the proper temperatures.

It is a further object to provide in such machine the drier whereby the eggs may be thoroughly dried after they have been heated in liquid baths.

It is a still further object to provide means for subjecting the eggs to an oil dip after they have been dried.

It is my further purpose to provide a machine having a conveyor arranged to carry the eggs to the successive baths and through the drier mechanism so that the whole machine is a unit and the eggs need not be handled from the beginning to the end of their treatment.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation, parts being shown in section, illustrating a machine embodying my invention.

Figure 2 is a detail, vertical sectional view illustrating the structure of the propeller for circulating the liquid in the first two mentioned baths for properly agitating the water and carrying it past the eggs being treated.

Figure 3 is a vertical, sectional view illustrating one form of holder by which the eggs may be supported on the endless conveyor, forming part of the machine.

Figure 4 is a detail view illustrating links of the chain of the endless conveyor.

Figure 5 is a vertical sectional view of the left-hand end of the mechanism shown in Figure 1 illustrating the left-hand end of the conveyor in side elevation and showing the first tank for bringing the eggs to a uniform temperature, in section.

Figure 6 is an enlarged vertical sectional view illustrating the right-hand end of the machine illustrated in Figure 1, parts being shown in side elevation and the second tank being shown in section.

Figure 7:
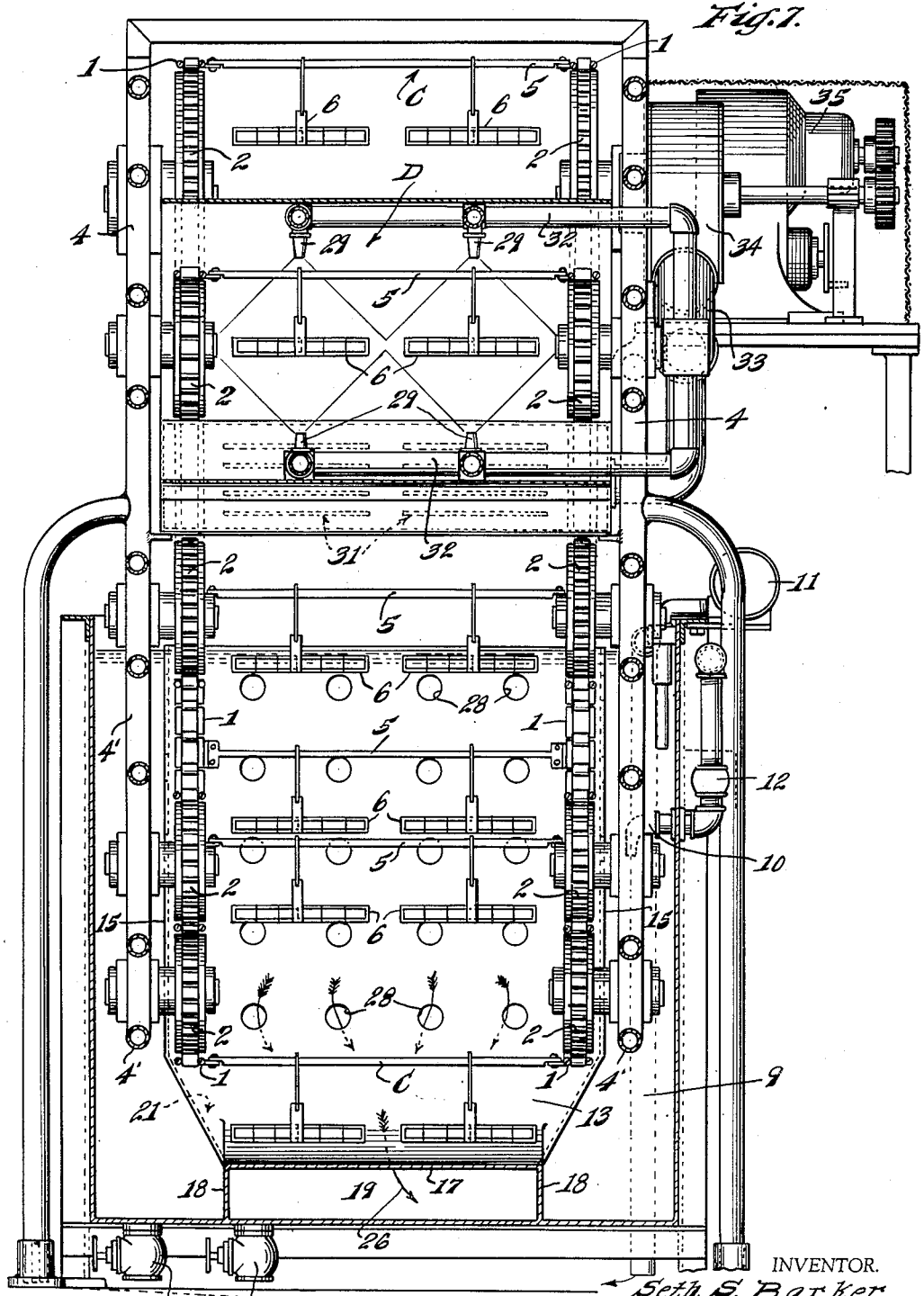
Figure 7 is a transverse vertical sectional view taken on the line 7—7 of Figure 6.

My machine is intended for practicing a method substantially like that of Professor Ernest M. Funk, of Columbia, Missouri, Serial No. 455,460, now Patent No. 2,423,233.

It has been found that if the egg germ is neutralized or destroyed, the eggs will keep better than otherwise. The germ may be destroyed by heat. It is difficult to bring the eggs to the critical heat for destroying the germs without partially cooking the eggs. Any substantial cooking is highly undesirable. There is therefore involved the problem of heating the eggs to the proper temperature for destroying the egg germ and rendering the eggs infertile without otherwise modifying the character of the egg to an extent which would impair its saleability. The temperature which will destroy the egg germ is approximately 136° F. If the egg be subjected to that temperature for the proper length of time, approximately seven minutes, the germ will be destroyed, but the egg will not be otherwise unfavorably affected.

It has also been found that as a practical matter, it is difficult to bring all of a large number of eggs to the 136° temperature in the proper time, unless the eggs are first brought to a lower uniform temperature. It will be obvious that if the eggs are heated to 136° F., kept at that temperature for seven minutes, the same results cannot be attained if the eggs are put into the bath sometimes at a temperature of, for instance, 60°, and at other times at a temperature, for instance, of 85°, but when all the eggs are first brought to a uniform temperature below that at which they will start to cook, they can thereafter be subjected to 136° temperature bath for seven minutes and substantially uniform results attained.

Conveyor

In my machine I provide a suitable conveyor. This may be any kind of a conveyor which will properly carry the eggs through the machine to subject them to the successive heating baths, drying mechanism and oil bath.

As here illustrated, the conveyor is indicated generally at C in Figures 1, 5, 6 and 7. It has a pair of laterally spaced chains 1 (Fig. 5) traveling over sprockets 2 and others arranged in laterally spaced pairs and mounted on suitable framework 4. The respective chains are connected at intervals by rods 5 (Figs. 3, 4 and 5) on which are hung egg carriers 6. The carriers 6 are loaded from a platform 7, and may be removed from the conveyor at the platform 7 or elsewhere, on the rods 5 of the conveyor. The conveyor may be as wide as desired and is illustrated here as wide enough to accommodate two egg carriers 6 hung side by side, as illustrated for instance in the upper part of Figure 7.

It will be understood that suitable sprockets 2 (Fig. 5) are provided, necessary to properly support and guide the chains. Any suitable means may be provided for driving some of the sprockets.

The conveyor travels downwardly past the platform 7 as indicated by the arrow below the left-hand egg carrier 6, and travels around the lower left-hand sprocket 2 of Figure 5 and thence upwardly over two pairs of sprockets 2, thence downwardly for carrying the eggs through the first bath for bringing them to the uniform temperature of approximately 130° F. As the eggs thus travel downwardly on the conveyor, they are guided into the left-hand tank 8 shown in Fig. 1 and illustrated in greater detail in Fig. 5. The tank 8 is substantially rectangular. The conveyor and the eggs move downwardly in the left-hand end of the tank 8. The chain 1 travels around the lower sprockets 2 in the tank 8 from the left to the right hand end of the tank, thence the chains travel around a series of sprockets 2 whereby the conveyor is carried back and forth in the tank, as clearly shown in Fig. 5, for thoroughly subjecting the eggs in the carriers 6 to the agitated heated water or other liquid in the tank.

As the eggs leave the tank, they are carried to the right and thence around suitable sprocket 2 upwardly, as shown at the right-hand end of Figure 5. They then travel further to the right to another pair of sprockets 2 illustrated in Figure 6, thence downwardly into tank 9, where they follow a path substantially similar to that traveled in tank 8. Tank 9 is substantially like tank 8.

From tank 9 the conveyor and the eggs travel upwardly as illustrated in Figure 6, through the drier D where the eggs are subjected to drafts or blasts of air. On emerging from the drier D the eggs are carried downwardly by the conveyor through the oil bath tank O, and from the oil bath tank O to the platform 7.

*Tanks*

Since the tanks 8 and 9 are substantially alike, I will describe only tank 9 in detail.

The frame 4 has portions 4' so hung as to project down into the tank so as to support the conveyor sprockets.

Each tank is provided with steam jets 10 for supplying steam to the water in the tanks. Suitable control mechanism 11 is provided for opening and closing the valves 12 of the steam jets according to the temperatures of the liquid in the tanks. Each tank is provided at its ends with false or baffle walls 13 and 14 extending partway across the tank. In tank 8 the baffle wall 13 is at the right-hand end and in tank 9 at the left-hand end. At each end of each baffle wall it is connected by a short wall 15 with the end wall of its tank. Thus there is formed a compartment or chamber at each end of each tank. The chambers at the left-hand end of tank 8 and at the right-hand end of tank 9 are closed at the top as indicated at 16 in Figure 6.

The chambers at the right-hand end of tank 8 and at the left-hand end of tank 9 are open at the top. The lower ends of the chambers at each end of each tank are connected by a false bottom member 17. The false bottom 17 is narrower than the tank in each instance, and is connected to the bottom by side walls 18 shown in Fig. 7, so as to leave the compartments at each end of each tank connected by a passage 19 in the bottom of each tank.

I have indicated the closed compartment at the left-hand end of tank 8 and at the right-hand end of tank 9, at 20, and the compartment at the opposite end of each tank at 21.

At the bottom of each compartment 20 is mounted a propeller 22, Figs. 5 and 6.

The shaft 23 which extends through the wall of the tank, is driven by a motor 24 through a suitable gearing mechanism 25. The propellers drive the water in the direction indicated by the arrows 26, Figs. 5 and 6. Water is pumped or driven upwardly into the compartment 20 and passes out through holes 27 in its walls 14 and 15, and travels across the tank in each instance to the compartment 21, which is provided with similar holes 28 in its walls 13 and 15. There is thus provided means for obtaining a uniform flow of water over the whole area of the tank. This facilitates transfer of heat from the water to the eggs and contributes to uniform transfer of heat to all the eggs in the tank in each instance. Water travels from each compartment 21 through the passage 19 back to the propeller.

By providing the continuous flow of the water, the time necessary for the treatment of the eggs in each tank is reduced and can be to a considerable extent controlled. It is obvious that by varying the number of eggs carried through the tank at any given time and by varying the speed of the water flow, the critical time may be varied somewhat. I have found however that by maintaining the water in the tank 8 at 130° F. and timing the conveyor so as to leave the eggs in the water for seven minutes while the water is flowing through the tank with fair rapidity, the eggs in tank 8 can be uniformly heated to approximately 130° F. Similarly, by maintaining the water in tank 9 at 136° F. and keeping the eggs in the water for seven minutes, the eggs in tank 9 can be heated to 136° F. and kept at that temperature long enough to destroy the germ or fertility without materially otherwise affecting the character of the eggs.

From the tank 8 the conveyor travels lengthwise to the right and thence upwardly, thence to the right again, then downwardly and through the tank 9. The path of travel of the conveyor through the tank 9 is substantially similar to its path of travel through tank 8.

From tank 9 the eggs travel upwardly and then to the right through drier D, where the eggs are subjected to jets of air from a plurality of nozzles 29, Fig. 6, so arranged that some direct air upwardly, some direct it downwardly and some in inclined drafts. It is important that the high velocity blast of air mechanically blows off the droplets and then evaporates the thin film of moisture left on both the eggs and lifters. The high velocity blast not only knocks off the droplets, but spreads any remaining moisture into a very thin film which readily evaporates.

The nozzles are supplied with compressed air from manifolds 30, 31 and 32 (Fig. 6) and some of the manifolds have holes through which air may be driven against the eggs in carriers 6. Air is supplied to the manifolds through pipe 33 and blower 34, driven by a motor 35, Fig. 5.

From the drier chamber D the conveyor carries the eggs through an oil bath in tank O and thence to the loading and unloading platform 7.

In Fig. 7 I have shown numerous details illustrating particularly a manner in which the frame parts are hung in the tanks for supporting the conveyor sprockets.

At 36 in Fig. 6 is shown a take-up mechanism for the chains of the conveyor. At 37 in Fig. 5 I show a tank drain valve. At 38 is a drain valve for the compartment 19.

The carriers 6 may have the form of wire baskets as illustrated in Fig. 3. As shown, the basket wire is so arranged as to hold the eggs with the small end down in substantially vertical position. It will be understood that the baskets are pivotally hung on the rods 5 and may be readily removed therefrom. The baskets in their detail are not part of my present invention.

In practical operation of my improved machine for processing eggs, the eggs are placed in the carriers 6, at the left-hand end of the machine as shown in Fig. 1, thence they travel through the tank 8 where their temperature is uniformly raised to 130° F. The eggs then travel through the tank 9 where the temperature is raised to 136° F. The length of time of travel through the tank 9 will be sufficient in a machine of this kind to destroy the egg germs. Incidentally, the treatment also destroys any bacteria on the surfaces of the eggs.

It will be understood that any changes in the arrangement of the structure may be made without departing from the spirit and scope of my invention, and it is my purpose to cover by my claims any modifications which may be reasonably included in their scope and the scope of my invention.

I claim as my invention:

1. In an apparatus for processing eggs, the combination comprising, a tank for the reception of a liquid, a vertical channel formed on the inner surface of each of opposite sides of the tank, one of said vertical channels having an open top and the other having a closed top, a channel formed on the bottom of the tank interconnecting said vertical channels, said vertical channels having openings formed therein communicating with the interior of the tank and said bottom channel being without openings, and impeller means in one of said channels for circulating liquid through the tank.

2. In an apparatus for processing eggs, the combination comprising, a tank for the reception of a liquid, a vertical channel formed on the inner surface of each of opposite sides of the tank, one of said vertical channels having an open top and the other having a closed top, a channel formed on the bottom of the tank interconnecting said vertical channels, said vertical channels having openings formed therein communicating with the interior of the tank and said bottom channel being without openings, and impeller means in one of said channels for circulating liquid through the tank, said impeller being operable to circulate the liquid in a direction from the interior of the tank into the vertical channel having the open top, and from the vertical channel having the closed top into the interior of the tank.

SETH S. BARKER.

REFERENCES CITED

The following references are of record in the file of this patent:

UNITED STATES PATENTS

| Number | Name | Date |
| --- | --- | --- |
| 669,250 | Burkholz | Mar. 5, 1901 |
| 876,757 | Winterlich | Jan. 14, 1908 |
| 989,141 | Gettelman | Apr. 11, 1911 |
| 1,082,743 | Gettelman | Dec. 30, 1913 |
| 1,227,101 | Wehmiller | May 22, 1917 |
| 1,493,987 | Kenney | May 13, 1924 |
| 1,520,424 | McCullough | Dec. 23, 1924 |
| 1,559,733 | Barger et al. | Nov. 3, 1925 |
| 1,807,677 | Torson | June 2, 1931 |
| 2,025,990 | Kokemper | Dec. 31, 1935 |